Figure 1:
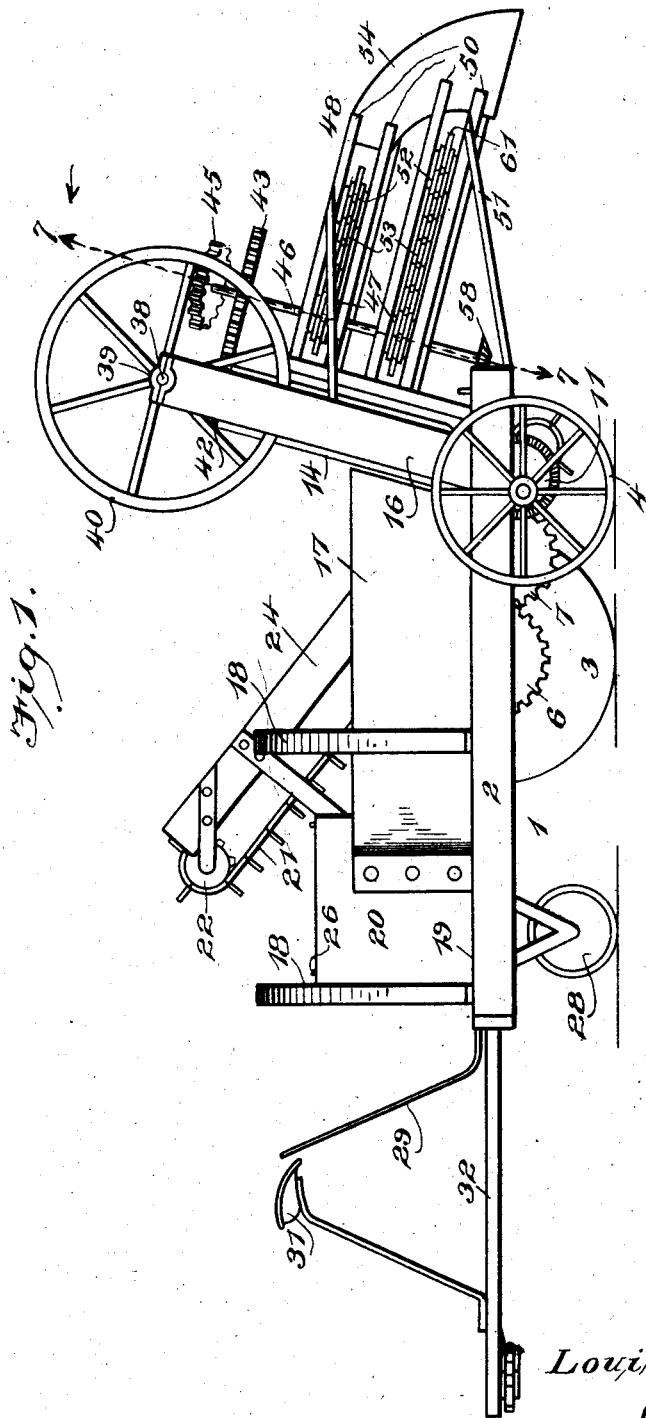

No. 879,150. PATENTED FEB. 18, 1908.
L. CUTTER.
CORN HUSKER.
APPLICATION FILED JUNE 26, 1906.

4 SHEETS—SHEET 1.

Witnesses
T. P. Britt
M. O. Bowling

Inventor
Louis Cutter
By Swift & Co.
Attorneys

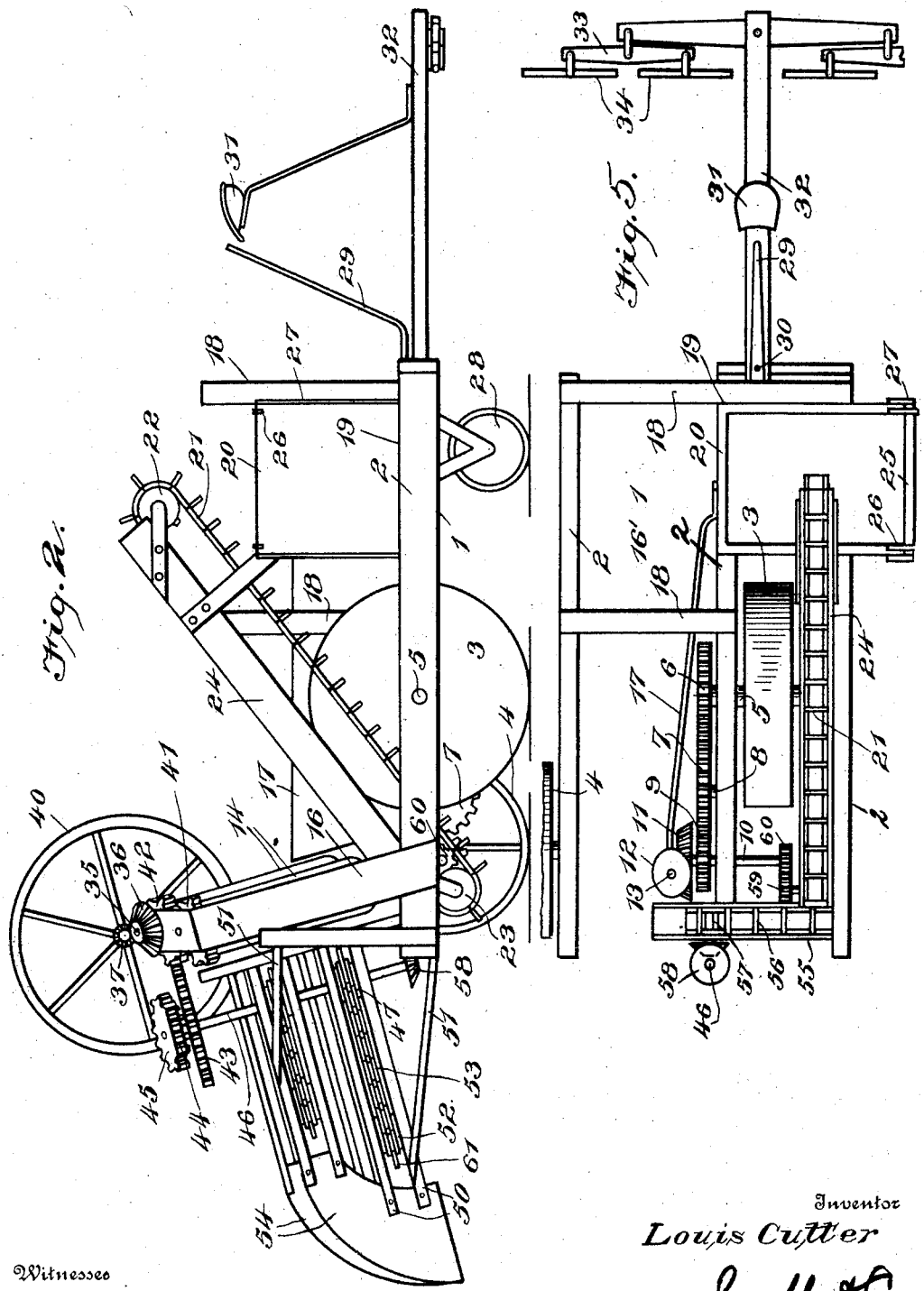

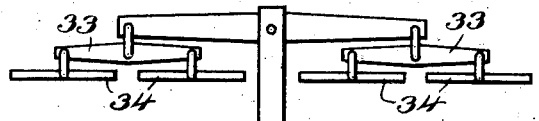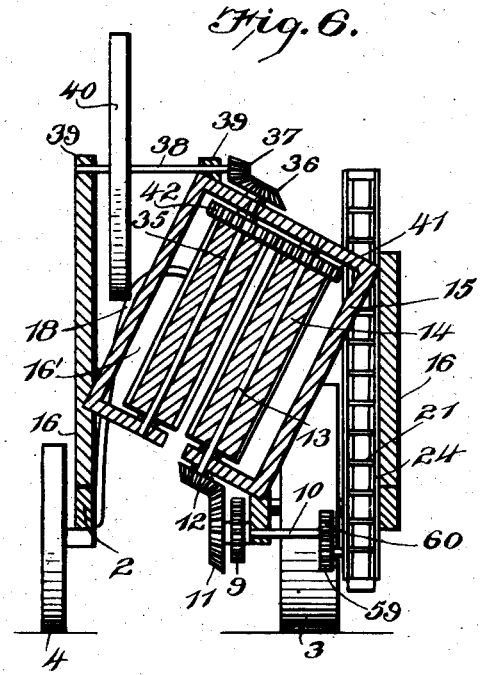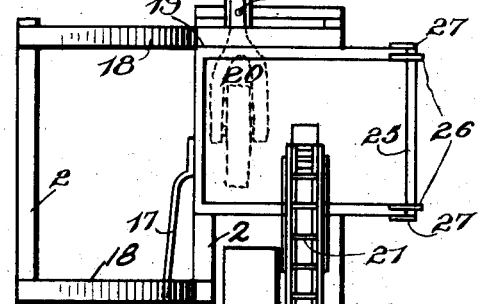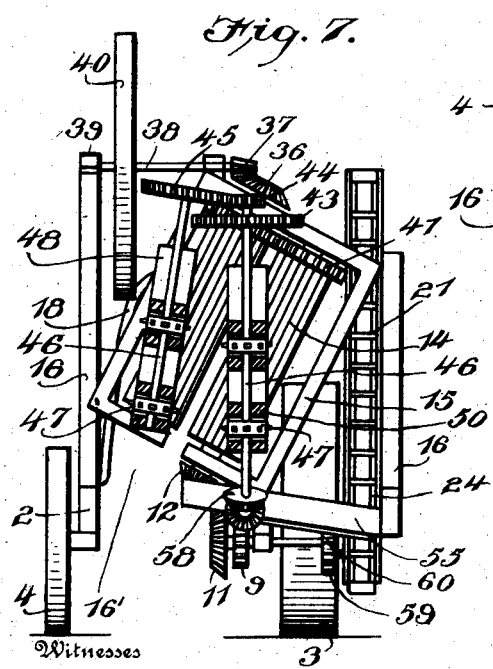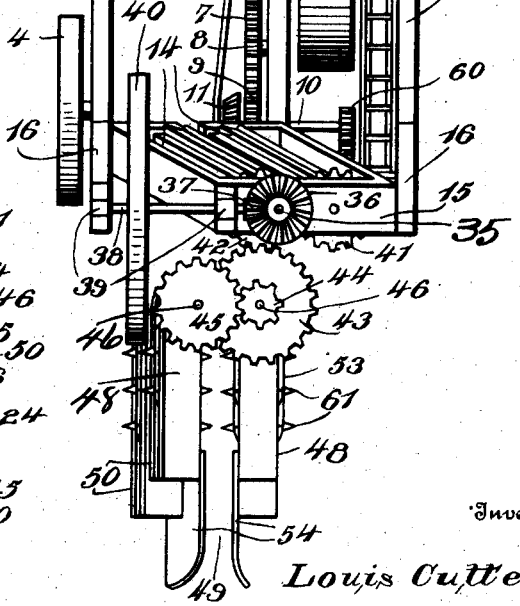

No. 879,150. PATENTED FEB. 18, 1908.
L. CUTTER.
CORN HUSKER.
APPLICATION FILED JUNE 26, 1906.
4 SHEETS—SHEET 4.
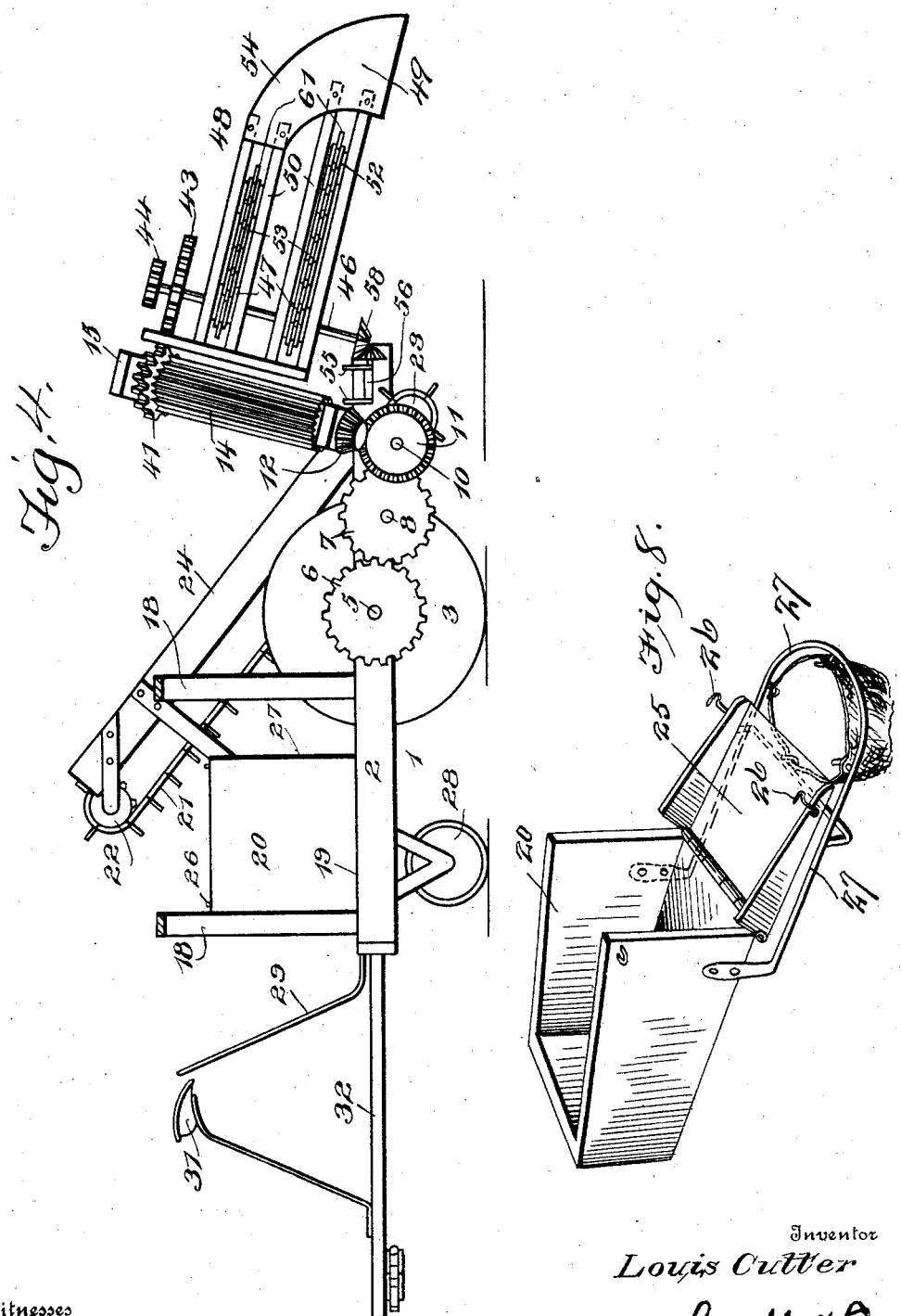
Witnesses
K. G. Whitcomb
M. O. Bowling
Inventor
Louis Cutter
By Swift & Co.
Attorneys

UNITED STATES PATENT OFFICE.

LOUIS CUTTER, OF BLADEN, NEBRASKA.

CORN-HUSKER.

No. 879,150.  Specification of Letters Patent.  Patented Feb. 18, 1908.

Application filed June 26, 1906. Serial No. 323,429.

*To all whom it may concern:*

Be it known that I, LOUIS CUTTER, a citizen of the United States, residing at Bladen, in the county of Webster and State of Nebraska, have invented a new and useful Corn-Husker; and I do hereby declare the following to be a full, clear, and exact description of the invention, such as will enable others skilled in the art to which it appertains to make and use the same.

The invention relates to a combined harvesting and husking machine, having an entrance mouth provided with a flaring portion and forming extensions, gathering chains mounted in said mouth for conveying the stalks back to the snapping and husking rolls, which husk the corn, which is then transmitted by suitable mechanism into a hopper or other suitable receptacle.

This invention comprises further objects and combinations of elements which will be hereinafter more fully described, shown in the accompanying drawings and the novel features thereof will be pointed out by the appended claims.

In the drawings, Figure 1 is a side elevation of the husker. Fig. 2 is a side elevation looking at the opposite side of the machine. Fig. 3 is a top plan view of the complete machine. Fig. 4 is a sectional view vertically through the machine. Fig. 5 is a view similar to Fig. 3, with some of the parts removed. Fig. 6 is a detail view showing the means for transmitting motion to the snapping and husking rolls and gathering chains and showing the gearing therefor. Fig. 7 is a vertical cross section on line 7—7 of Fig. 1. Fig. 8 is a perspective view of the hopper and its chute.

Making renewed reference to the accompanying drawings, 1 designates the main frame of the machine comprising three parallel beams 2, 2 between two of which the main drive wheel 3 is journaled, and journaled in a suitable bearing of the third beam is the wheel 4 as shown.

The shaft 5 of the drive wheel, has mounted upon one end a gear wheel 6, which meshes with a second gear wheel 7 mounted upon a shaft 8 and adapted to mesh with a third gear wheel 9 also mounted upon a stub shaft 10; this third wheel 9 is adapted to mesh with a beveled gear 12 carried by the shaft 13 of one of the corrugated snapping and husking rolls 14, for the purpose of rotating them as will be understood from the drawings, which snapping and husking rolls are journaled in bearings in the inclined disposed frame 15 fixed between the standards 16 which project vertically from the front ends of the outermost beams 2 composing the frame of the machine.

Two of the beams 2 form a channel 16' through which the stalk passes, as the machine is driven forward, one side of the channel being provided with a shield 17, which protects the gear wheels 6, 7, 9 and 11 as will be understood from the drawings. The beams forming this channel are also provided with arched braces 18 which hold them in fixed relation with one another, as shown.

Mounted upon the middle beam and one of the outside beams as at 19, is the hopper 20, in which the ears of corn are delivered from the elevator conveyer 21 which travel over the sprocket wheels 22 and 23 and through the trough 24. The hopper 20 is provided with a swinging chute 25 which, when closed, is fastened by means of the latches 26 and when lowered will allow the ears of corn to enter the bags which may be supported by the bail 27, the arms of which are fixed to the sides of the hopper and extend downwardly in correct relative position to the chute when lowered, as shown in the accompanying drawings.

To guide the apparatus, a suitable steering wheel 28 is provided, which is journaled in the forks of the lever 29 which is pivoted at 30 and extends back to the operator's seat 31, and within reach of the operator which seat is fixed upon the tongue 32 projecting rearwardly of the machine. Carried by the end of the tongue is the evener, comprising a pair of doubletrees 33, each having a pair of swingletrees 34 to which horses may be hitched for driving the machine forward as will be understood.

To the upper end of the shaft 35 of one of the snapping rolls is fixed a beveled gear 36 which is in mesh with a beveled pinion 37 carried by the shaft 38 which is mounted in suitable bearings 39 of the inclined disposed frame 15 and one of the standards 16 as clearly shown in the drawings; the shaft 38 is provided with a suitable fly wheel 40 as is also clearly illustrated in the drawings.

Fixed adjacent the upper ends of the shafts 13 and 35 of the snapping and husking rolls are the gear wheels 41 and 42 meshing with one another as shown; the gear wheel 42 being also in mesh with the gear wheel 43 which is connected with a pinion 44, which in turn is in mesh with the gear wheel 45. These gear wheels 43 and 45 are carried by the vertically disposed shafts 46, each having a pair of sprockets 47, and being mounted in suitable bearings of the entrance mouth 49 of the apparatus, into which the stalks are received as the machine is driven forward.

The frame forming the entrance mouth is composed of the horizontal parallel pieces 50 between which each pair of sprockets 47 are mounted as shown; these pieces 50 are suitably braced to the beams 2, by the rods 51. Also between the pieces 50 near the extreme ends thereof are the sprockets 52 over which the gathering chains 53 travel, which chains also travel over the sprockets 47. The entrance mouth is flaring as shown, which flaring portion is composed of the guide plates 54, which are fixed to the pieces 50.

Mounted with relation to the combined husking and snapping rolls so as to receive the ears, after being snapped from the stalks, is the trough 55, through which the conveyer 56 travels and is operated by the sprockets 57 over which it travels; one set of said sprockets 57 being operated by means of the beveled gearing 58 with the extension of the shaft 46 as will be clearly understood from the drawings. The conveyer 56 extends to the lower end of the elevator conveyer 21, so as to transmit the ears of corn thereto, after which they are delivered into the hopper as clearly understood. The elevator conveyer is operated by means of the gear 59 of the lower end thereof and the gear 60 carried by one end of the shaft 10 of the gear 9 as clearly illustrated in the drawings. The husking chains are provided with teeth 61 or other suitable means for assisting in conveying the stalks back to the snapping and husking rolls.

What I claim is,

A combined harvesting and husking machine comprising a frame composed of three horizontal parallel beams, arched braces for two of said beams forming a channel, a driving wheel journaled between the middle beam and one of the outer beams, a pair of standards, each one of which projects vertically from one of the outer beams and a vertically disposed frame mounted between said standards, a pair of upwardly extending snapping and husking rolls having shafts journaled within said frame, said rolls being provided upon their upper ends with gear wheels adapted to mesh with one another, the upper end of one of the shafts of one of said rolls being provided with a beveled gear, a shaft mounted within suitable bearings of the inclined frame and one of the standards and having a bevel pinion to mesh with said beveled gear, a fly wheel carried by said shaft, a flaring entrance mouth comprising a plurality of parallel pieces having guide plates secured thereto, said entrance mouth being provided with vertical shafts having suitable gearing at the upper end thereof which also meshes with one of the gears of the upper end of the rolls for transmitting motion thereto, said shafts of the entrance mouth having sprocket wheels thereon, sprocket wheels journaled in the outer end of said pieces forming the entrance mouth, gathering chains having teeth or other suitable means for gathering the stalks operated by the sprockets of the entrance mouth, a horizontally disposed trough, a conveyer adapted to move within said trough, an elevator conveyer to coöperate with said horizontal trough and having a gear at the lower end thereof, a train of gears adapted to coöperate between the driving wheel and one of the snapping and husking rolls for transmitting motion thereto, and a gear operated by said train of gears adapted to engage the gear carried at the lower end of the elevator conveyer, substantially as specified.

In testimony whereof I have signed my name to this specification in the presence of two subscribing witnesses.

LOUIS CUTTER.

Witnesses:
  V. S. HALL,
  J. O. HALL.